United States Patent [19]

Shuey et al.

[11] Patent Number: 5,407,476

[45] Date of Patent: Apr. 18, 1995

[54] QUEBRACHO/SURFACTANT COMPOSITIONS AS UNIVERSAL BITUMEN/WATER EMULSIFIERS

[75] Inventors: Mark W. Shuey, San Jose; Robert S. Custer, Whittier, both of Calif.

[73] Assignee: Saramco, Inc., Whittier, Calif.

[21] Appl. No.: 255,339

[22] Filed: Jun. 7, 1994

[51] Int. Cl.⁶ .......................................... L09Q 195/00
[52] U.S. Cl. ..................................... 106/216; 106/277
[58] Field of Search .............................. 106/216, 277

[56] References Cited

U.S. PATENT DOCUMENTS

| | | | |
|---|---|---|---|
| 3,615,780 | 10/1971 | Kim et al. | 106/617 |
| 4,391,645 | 7/1983 | Marcellis et al. | 106/314 |
| 4,502,969 | 3/1985 | Shell | 255/8.55 R |

FOREIGN PATENT DOCUMENTS 63-17960  1/1988  Japan .

*Primary Examiner*—David Brunsman
*Attorney, Agent, or Firm*—Jacques M. Dulin; Fred J. Zustak

[57] ABSTRACT

Emulsifier compositions comprising a mixture of quebracho, a surfactant, water, and a pH adjusting reagent for dry and aqueous anionic emulsifiers for producing universal bitumen-in-water emulsions. These emulsifiers are particularly useful in producing stable, anionic asphalt-in-water emulsions that are universal, i.e., they can be used as is or with a wide variety of fillers, additives, pigments and the like, including fine particulate materials, without premature breaking. In the preferred emulsifier, crude, spray-dried quebracho is mixed with an alpha olefin sulfonate containing 10 to 20 carbon atoms, and the pH is preferably adjusted to pH 10 producing an anionic emulsifying agent. The pH may be adjusted from pH 4.5 to pH 11.5. Asphaltic emulsions made with the quebracho emulsifier exhibit enhanced stability, increased viscosity, high ionic headroom and decreased drying times. The residual asphalt coat modified with quebracho exhibits increased adhesion, cohesion, hardness, viscosity and ductility and increased softening temperature as compared to base asphalt in water emulsions not having quebracho in the emulsifier. The emulsifier composition of this invention can be prepared in dry, powdered form or in aqueous solution form. Direct addition of quebracho to asphalt prior to emulsification is taught.

10 Claims, 1 Drawing Sheet

QUEBRACHO/SURFACTANT COMPOSITIONS AS UNIVERSAL BITUMEN/WATER EMULSIFIERS

CROSS-REFERENCE TO RELATED CASE

This application is related to an application entitled Quebracho-Modified Bitumen Compositions, Method of Manufacture and Use, Ser. No. 08/255,323, filed Jun. 7, 1994, by the same inventors, the disclosure of which is incorporated by reference if need be. That application relates to non-emulsified quebracho-modified bitumen compositions. This application relates to bitumen-in-water emulsions.

1. Field of the Invention

This invention relates to an emulsifying composition and its method of use, and more particularly to a mixture of quebracho and a surfactant for use as an emulsifying agent for asphalt to provide stable, slow-setting, anionic, universal asphalt-in-water emulsions that dry faster, have higher viscosity and yield residual asphalt having higher viscosity, a higher softening temperature, greater ductility, faster curing time, increased adhesion and increased cohesive strength as compared to existing asphalt-in-water emulsions.

2. Background of the Invention

Asphalt has found widespread use as a construction material particularly in the construction of highway pavements, roofing materials, coating building foundations and the like. At ambient temperatures, asphalt is a solid or highly viscous semi-solid liquid. To obtain a low viscosity liquid for easy application, asphalt is heated to reduce the viscosity, dissolved in organic solvents, or emulsified in water using emulsifiers and mechanical shearing. Although asphalt-in-water emulsions are chiefly used for road, parking lot and driveway surfacing, they are also used in the formation and repair of roof surfaces; for damp and waterproofing; for paints, pipe coatings, mastics, anticorrosive coatings; and other applications. For these applications, asphalt-in-water emulsions can be used either alone or in combination with pigments, fillers, fibers, and other inert materials. Depending on their formulation and properties, they can be applied by spray, brush, or squeegee. Such uses, however, may require modifications of the asphalt in order to either facilitate its use or to control other attributes such as drying rates, hardness, water content and dispersion.

There are three categories of asphalt-in-water emulsions determined by the ionic charge of the emulsion. Cationic emulsions contain positively charged particles, whereas anionic emulsions contain negatively charged particles. A non-ionic emulsion is charge neutral. An asphalt emulsion may be further categorized by how quickly it sets up and how long the emulsion is workable. Rapid (fast)-setting emulsions are designed to react with aggregate and quickly revert from the emulsified state to separate states of asphalt and water which runs off and/or evaporates. Fast-setting asphalt emulsions are primarily used for spray applications, such as aggregate (chip) seals, sand seals, surface treatments and asphalt penetration through layers of broken stone. Medium-setting emulsions are designed for mixing with coarse or fine aggregate. These emulsions are more stable than rapid setting emulsions and remain workable for a few minutes. Slow-Setting emulsions are designed for maximum mixing stability. The long workability permits thorough mixing with dense-grade aggregates having a high fines content. An anionic, slow-setting emulsion depends solely upon evaporation of the water of the emulsion in order to obtain the asphalt residue coating. That is, the slow-setting emulsion should not coalesce, known as "breaking" upon application of fillers or pigments.

Emulsifying asphalt in water requires the use of an emulsifying agent. Typically, saponification of resins, by alkaline hydrolysis of the resin or by neutralization of fatty acids, yields a detergent or surfactant which may be suitable for use as an asphalt in water emulsifying agent. However, the effectiveness of an emulsifying agent in dispersing asphalt in water varies widely and is unpredictable, in part due to the molecular weight distribution of the original resin or fatty acids. Consequently, not all resins or fatty acids will produce an effective asphalt emulsifier, and there is no known accurate predictor of emulsification effectiveness.

Surfactants are generally classified as anionic, non-ionic, or cationic. The surfactant keeps the fine asphalt droplets in stable suspension and controls the breaking time. The surfactant changes the surface tension between the asphalt and water at their interface.

There are many kinds of commercially available surfactants including: 1) olefin sulfonates (such as Bio-Terge AS-90 beads manufactured by Stepan Co., Calsoft AOS-40 manufactured by Pilot Chemical Co., and Witconate AOS manufactured by Witco); 2) lignin sulfonates and their derivatives (such as Lignosite 458 & 823 manufactured by Georgia-Pacific, Temsperse products manufactured by Temfibre, and Indulin SAL manufactured by Westvaco); and 3) alkylaryl sulfonates (such as Calsoft F-90 manufactured by Pilot Chemical Co., and Witconate LX manufactured by Witco).

A commercially available natural acid resin used as an emulsifying agent is Vinsol ® Resin (a natural pine wood resin extracted by Hercules Inc., Wilmington, Delaware from Southern Pine tree stumps). Neutralizing Vinsol ® with caustic soda (NaOH) or caustic potash (KOH) forms an anionic water soluble soap used extensively as an anionic emulsifier for asphalt emulsions. Typically, Vinsol ® is added to water at the rate of 6%–10% w/w with water, which in turn is combined with molten asphalt in a shearing mixer, typically a colloid mill. The mixing machine disperses the asphalt in tiny particles throughout the dilute soap Vinsol ® mixture. The final concentration of Vinsol ® in the finished asphalt-in-water emulsion is typically 3%–4% w/w emulsion. The Vinsol ® product, however, is becoming increasingly more expensive as supplies are dwindling, since the Southern Pine tree stumps required for its manufacture are in short supply and less accessible. No suitable replacement for this product has been identified for producing asphalt emulsions.

Whereas a strong emulsifying agent is required to prepare stable anionic slow-setting emulsions of asphalt in water, an even more difficult emulsifying task is to prepare a stable pavement sealer emulsion. Pavement sealers are asphalt-in-water emulsions that contain fillers and additives such as fine aggregate, fibers, clays, and the like. These fillers and additives are used to fill small cracks which occur over time due to weather and wear, and to seal to asphalt pavement. The practice in the industry is to add from about one to three pounds of fine aggregate, fibers, or other filler material per gallon of asphalt-in-water emulsion. The presence of these small particles makes it more difficult to maintain a stable emulsion that does not break down into its water and asphalt components. It typically requires up to twice as much emulsifier to produce a stable asphalt pavement sealer composition as to simply prepare a stable asphalt in water emulsion having no fillers or additives. Consequently there is a need for an emulsifying agent capable of producing a stable filled asphalt-water emulsion without having to have added an additional amount of the emulsifying agent.

Use of tannin or a tannin compound in an asphalt-in-water emulsion is alleged in the published Kao Soap Company Japanese patent document of Ryooichi, et al. (Japanese patent document 63-17960). This Kao Soap document reports on a slow-setting, cationic, asphalt-in-water emulsion. The emulsifying composition includes a surfactant, a tannin or tannic acid compound, calcium chloride and hydrochloric acid to adjust the pH. Quebracho is listed as one of the tannic acid compounds that can be used. The emulsifying composition is combined with heated asphalt in the ratio of 40% w/w emulsifying agent to 60% w/w asphalt. However, the amount of tannic acid or tannic acid-like compound shown by Ryooichi et al. comprises only 0.3%–0.4% w/w of their finished asphalt-in-water emulsion. Attempts to produce a stable anionic asphalt in water emulsion using 0.3% sodium oleate and 0.3% quebracho as cited in the reference were unsuccessful. Doubling the sodium oleate concentration to 0.6% and the quebracho concentration to 0.6% also proved unsuccessful as the combination did not produce a continuous phase asphalt-in-water emulsion, rather producing solid chunks of asphalt in a watery matrix. The cationic process taught by the Kao Japanese patent publication is not applicable to the production of an anionic asphalt-in-water emulsion.

Quebracho is a natural product extracted from the heartwood of the Schinopsis trees that grow in Argentina and Paraguay. Quebracho is a well characterized polyphenolic and is readily extracted from the wood by hot water. Quebracho is currently widely used as a tanning agent. It is also used as a mineral dressing, as a dispersant in drilling muds, and in wood glues. Quebracho is commercially available as a crude hot water extract, either in lump, ground, or spray-dried form, or as a bisulfite treated (refined) spray-dried product that is completely soluble in cold water. Quebracho is also available in a "bleached" form which can be used in applications where the dark color of unbleached quebracho is undesirable.

Consequently, there is a strong felt need for improved emulsifier compositions capable of emulsifying asphalt, and particularly for stable, slow-setting asphalt-in-water emulsions capable of accepting fillers, additives, pigments and the like.

THE INVENTION

Objects

It is among the objects of this invention to provide an emulsifier containing quebracho for producing anionic asphalt-in-water emulsions.

It is another object of this invention to provide a process for making an asphalt emulsifier composition containing quebracho.

It is another object of this invention to provide a method of use of an emulsifier containing quebracho for addition to asphalt to provide asphalt-in-water emulsions.

It is another object of this invention to provide an asphalt-in water-emulsion exhibiting enhanced properties including higher viscosity and faster drying, and to yield an asphalt residue from such emulsion having greater resistance to abrasion, higher viscosity, increased adhesion to substrates, higher softening point, increased cohesive strength and increased ductility as compared to asphalt-in-water emulsions not containing quebracho.

It is another object of this invention to provide a method of making an asphalt-in-water emulsion with an emulsifier containing quebracho.

Yet another object of this invention is to provide a use of an asphalt emulsifier containing quebracho and having the characteristic of providing a highly stable emulsion upon the addition of filler materials.

Still other objects, features, aspects and advantages of the present invention will become apparent from the following Summary, Detailed Description and claims of the present invention, when taken in conjunction with the accompanying drawing.

SUMMARY

We have discovered that effective universal emulsifiers may be made by mixing quebracho with certain surfactants and adjusting the pH to the desired level to produce an anionic emulsifier. The mixture of quebracho and surfactant can conveniently be made as a simple dry blend, or it may be made as a concentrated solution. The pH adjusting reagent, if needed, may be included with the dry blend or may be added separately by the user.

All of the common grades of quebracho contain water: crude lump typically contains 18–20% water, crude spray-dried typically contains 5–6% water, and spray-dried refined typically contains 5–8% water. Quebracho as a natural product is a well characterized and consistent source of the polyphenolic component used in the emulsifier compositions of this invention.

Crude quebracho is not fully soluble in cold water unless the water is adjusted to a pH above about 8.5. However, the crude material will dissolve slowly at water temperatures above about 120° F. The refined spray-dried quebracho results from treatment of the crude quebracho with sodium bisulfite and is fully soluble in cold water, creating an acidic solution.

Quebracho by itself is not an effective asphalt emulsifier. However, when used in combination with a surfactant, quebracho produces a very stable emulsion of asphalt-in-water. There are a large number of materials that are commercially available as surfactants. Of these, there are a few classes of surfactants that we have found to be useful in combination with quebracho to produce effective emulsifiers. These surfactants are the metal or alkali salts of either olefin sulfonates or alkylaryl sulfonates. These surfactants are commercially available as either liquid solutions or as granular or flaked solids. Surprisingly, the quebracho/surfactant mixtures of this invention produce an asphalt-in-water emulsion that is so stable and long lasting that it can be loaded with fine particulate fillers to form stable anionic slow-setting emulsions suitable as pavement sealer compositions.

The amount of quebracho and surfactant required to obtain a stable emulsion will vary depending upon a number of factors, including the particular asphalt used, the nature of any additives in the asphalt, the nature and amount of particles or fibers to be added to the asphalt emulsion, temperature, and the nature of the substrate.

We have discovered that the quebracho required for emulsification may be introduced either directly into the asphalt or into the emulsifier solution. In the event that the quebracho is added directly to the asphalt in sufficient quantity, only an aqueous emulsifier solution containing the surfactant and the pH adjustment reagent need be prepared, to be later added to the quebracho/asphalt composition, in order to produce the asphalt-in-water emulsion. This may simplify operations when a manufacturer has opted to treat the asphalt directly with quebracho as an additive to obtain the benefits of greater adhesion, higher softening point, higher viscosity, greater cohesive strength, increased hardness, more rapid drying, etc. Adding quebracho directly to asphalt at a level of 4.3 parts or more of quebracho (dry basis) per 100 parts of asphalt requires no further quebracho addition in the emulsifier solution.

The quebracho used may be any of its normally available commercial forms. The crude lump quebracho should be ground to a fine particle size to permit it to be easily solubilized in the surfactant soap solution. In ground form it is typically a reddish brown or maroon colored powder. Alternately, unground lump quebracho may be added directly to hot asphalt. The contained moisture in the quebracho will be driven off, creating a mechanical agitation or turbulence that will assist in the break up of lumps and dispersion of the quebracho throughout the hot asphalt. The lump material can sink to the bottom, however, and in that case it is necessary to provide some additional agitation to break up the lumps and disperse all of the quebracho into the hot asphalt.

The pH-adjusted emulsifier solution produced by mixing the reddish-colored, powdered quebracho in water with the salts of alpha olefin sulfonates or alkyl aryl sulfonates is a rich dark color, even absent any asphalt. This color persists into the final asphaltic coating product. As a result, it is possible, by using the emulsifiers described herein, to reduce or eliminate the addition of the black ink or pigment that is typically added to asphaltic emulsions used in pavement sealers.

The final pH of the asphalt-in-water emulsion may be between 4.5–11.5. The emulsion may still be anionic even with a pH less than 7 when the charge of the emulsion is negative. Anionic emulsions of this invention have been produced with an emulsion pH of 4.5.

The following are terms, their abbreviations and intended meanings used in describing the compositions and methods of this invention:

Quebracho ("Q") refers to the wood and bark extract of any number of South American trees of different genera of the order Sapindales. The main components are aspidospermine, tannin, tannic acid, and quebrachine. The two principle grades of quebracho include crude quebracho ("Q", same as quebracho), and bisulfite-treated or refined quebracho ("RQ").

Bitumen ("B") refers to any thermoplastic, naturally occurring or pyrolytically obtained substance having a dark to black color consisting almost entirely of carbon and hydrogen, with some nitrogen, sulfur, and oxygen. The term is intended to include heavy oils, tars, pitch, asphalt, and asphaltines.

Asphalt ("As") refers to any of the varieties of naturally occurring and petroleum-derived bitumens of varying molecular weights from about 400 to above 5000, and composed of hydrocarbons and heterocyclics containing nitrogen, sulfur, and oxygen.

Caustic ("C") refers to any number of alkaline, alkaline-earth or ammonium salt compounds having broadly basic properties, that is, a compound that readily ionizes in aqueous solution so that the pH is high (above 7) and includes alkaline and alkaline-earth hydroxides, sodium carbonate, bicarbonate of soda, water glass (sodium metasilicate), Nahcolite, trona, sesquicarbonate, ammonium hydroxide, ammonium carbonate, ammonia (gas or solution), or any other suitable base.

Surfactant ("SA") refers to any substance that, even though present in small amounts, migrates to the interface between two phases and exerts a great effect on the surface energy of the liquid or solid surfaces. The preferred surfactant of the product and method of this invention is alpha olefin sulfonate ("AOS"), a sodium salt of the sulfuric acid derivative from the treatment of petroleum hydrocarbons.

ASTM refers to standards set forth by the American Society for Testing and Materials.

BRIEF DESCRIPTION OF THE DRAWING

The invention is illustrated by reference to the drawing, in which.

DETAILED DESCRIPTION OF THE BEST MODE

Figure 1:
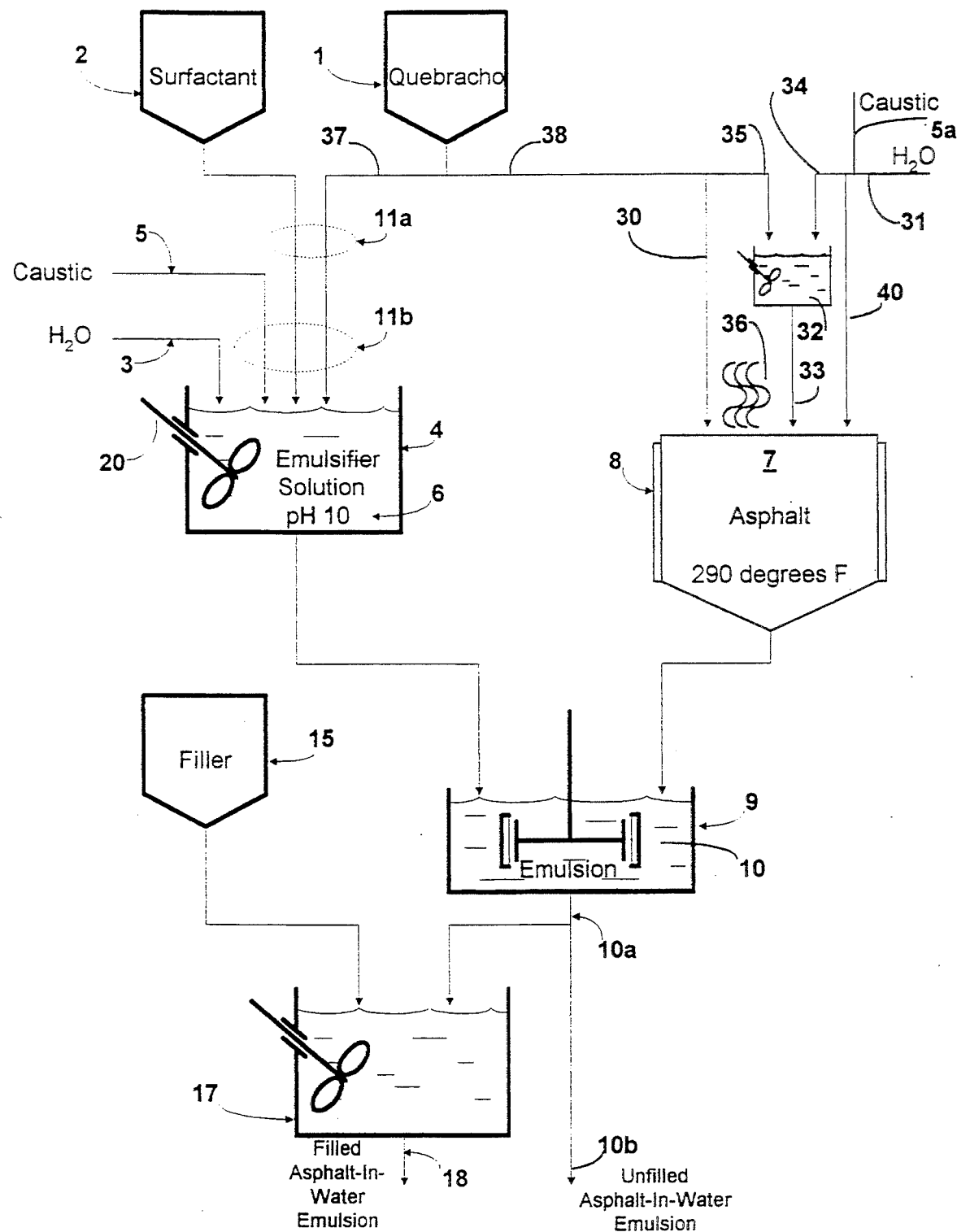
Fig. 1 shows a process flow diagram of the alternate preferred methods of making quebracho-containing emulsifier solutions and asphalt-in-water emulsions of this invention.

The following detailed description illustrates the invention by way of example, not by way of limitation of the principles of the invention. This description will clearly enable one skilled in the art to make and use the invention, and describes several procedural embodiments, procedural adaptations, variations, alternatives and uses of the invention, including what we presently believe is the best mode of carrying out the invention.

The asphalt in water emulsification process is shown in FIG. 1. In the preferred process for making a slow setting anionic asphalt in water emulsion, dry powdered crude quebracho 1 is combined with a surfactant 2 and water 3 in a mixing vessel 4. The quebracho is added at a rate of between 2.0%–10.0% dry w/w to water and the surfactant is added at a rate of 0.5%–3.0% w/w to water. Sufficient caustic is added to adjust the pH to between 8.5 and 10.5, preferably about 10. A mixer 20 ensures thorough dissolution of the quebracho into the emulsifier solution 6.

Asphalt 7, heated to approximately 290° F., is maintained at that temperature in a vessel 8 in order to reduce its viscosity to facilitate handling and mixing. The heated asphalt is transferred from vessel 8 and combined with the emulsifier solution 6 in a shearing or colloid mill 9 in the ratio of 20%–60% w/w emulsifier solution to 80%–40% w/w asphalt, preferably 40% w/w emulsifier solution to 60% w/w asphalt. The asphalt in water mixture is milled until an emulsion 10 is formed. The combined concentration of the surfactant and the quebracho in the final emulsion should be between about 2.5%–3.0% w/w, with the surfactant being 0.3%–1.0% and the quebracho being from about 2.7%–1.5% w/w.

The preferred emulsifying composition (6, 11a, 11b) may be prepared as a premixed dry powder by dry blending the selected grade of quebracho and solid granular (powdered) surfactant in the above ratios to obtain a dry, stable emulsifier blend 11a. An alternate preferred method is to add the caustic 5 in the dry blend 11a in the ratio needed to produce a dry anionic emulsifier blend, 11b. The caustic may be sodium hydroxide, sodium carbonate, potassium hydroxide, or any other suitable caustic in granular, bead, or flake form for the powdered premixed anionic emulsifier composition.

Alternatively, all the emulsification components may be added separately to the water 3 in the preparation of the emulsifier solution 6. In this case, either a solution or solid form of the surfactant 2 may be used. Fillers 15 may be combined with the asphalt in water emulsion 10 in a mixer 17 to produce a filled asphalt in water emulsion product be suitable for use as a pavement sealer. As compared to other emulsifiers, surprisingly the quebracho/surfactant emulsifier composition of this invention produces a strong enough anionic emulsion that additional quantities of an emulsifying agent are not required in order to prepare a stable filled asphalt in water emulsion. That is, the pH-adjusted, quebracho/surfactant emulsifier composition has enough emulsification capacity (ionic surplus or headroom) to prevent the asphalt/water emulsion from breaking when fillers are added. This vastly simplifies processing, as the resultant asphalt-in-water emulsion 10 of this invention is, in that sense, universal. It can be used straight, or with a wide variety of fillers, even fillers having a high fines content.

Alternately, as seen in the upper right of FIG. 1, spray-dried refined (bisulfite treated) or spray-dried crude quebracho may be introduced directly into the asphalt via lines 38 and 30. Caustic may be introduced directly to the asphalt, either alone or with water, via lines 34 and 40 in order to improve the dissolution of the quebracho in the asphalt. Alternately, the quebracho 35 may be predissolved in tank 32 in water 31 and then added from tank 32 as a water solution 33, pH adjusted if necessary with caustic for complete solubility. The solution of quebracho, or pH adjusted quebracho, can be added directly to the asphalt. This addition of a solution to the hot asphalt results in the boil off of the moisture 36 leaving an intimate mixture of the quebracho with the asphalt. The quebracho/asphalt mixture 7 is not an emulsion. This is emulsified by further processing in mill 9 as described above with an emulsifier solution from tank 4. In this case, quebracho need not be added via line 37 to the solution 6 as it is already contained in the asphalt/quebracho mixture in tank 8. However, if desired, the quebracho addition can be split, i.e., some of the quebracho may be introduced into the ultimate asphalt-in-water emulsion products 10b or 18 via line 37 and emulsifier solution 6, and the rest added directly into asphalt 7 via lines 38, 30 and/or lines 35, 33.

EXAMPLE 1

QSAC Emulsifier Solution (Alkaline pH)

An anionic bituminous emulsion of this invention was prepared employing crude spray-dried quebracho. The emulsifier was prepared by mixing crude, spray-dried quebracho (Q) with a surfactant (SA), in this case, Bio-Terge AS-90 Beads (Stepan Chemical Company), a $C_{14}$–$C_{16}$ alpha olefin sulfonate containing 90% active ingredients in dry powdered form, to form a mixed powder (QSA), then adding this powder mixture to water, mixing until dissolved, and adjusting the pH to 10 with bead NaOH (C) to form a pH-adjusted emulsifier solution (QSAC) of this invention. The QSAC emulsifier solution and asphalt having a penetration value of 75 were combined in a colloid mill to produce a bituminous emulsion. The resulting emulsion had the following composition:

TABLE I

| Example 1: Asphalt-in-Water Emulsion Composition | | |
|---|---|---|
| COMPONENT | AMOUNT | % w/w |
| Asphalt | 13,841 gms | 61% |
| Quebracho (crude, spray-dried) | 590 gms | 2.6% |
| Surfactant (Bio-Terge AS-90 Beads) | 91 gms | 0.4% |
| NaOH (to produce pH 10) | 73 gms | 0.3% |
| Water | 8,096 gms | 35.7% |

The resulting emulsion was tested pursuant to ASTM D 244 and D 88 standards and had the following properties:

TABLE II

| Example 1: Anionic QSAC Emulsion Properties | |
|---|---|
| TEST | DATA |
| Residue | 61.0% |
| Sieve Residue | Nil |
| Cement Mixing | 0.66% |
| Charge | Negative |
| Viscosity, 77° F. | 30 sfs * |

* sfs = Saybolt Furol Seconds

The emulsion passed the ASTM Standards for a slow-setting emulsion. The emulsion was easy to apply, free flowing, and after application to the surface being coated, the water evaporated in a controlled manner.

The residual asphalt from the above ASTM Test D 244 was compared with the base asphalt used in preparing the above emulsion. Table III shows the results:

TABLE III

| Comparison of Emulsion Residual Asphalt to Non-Emulsified Base Asphalt Component | | |
|---|---|---|
| ASTM STANDARD, TEST NO. | EMULSION RESIDUAL ASPHALT | BASE ASPHALT |
| Softening Point, D 36 | 118° F. | 114° F. |
| Viscosity, D 4957 | 1963.8 Poises | 1248.7 Poises |

The emulsifier composition of this invention not only produced an emulsion with a cement mixing test of only 0.66% (an emulsion stress test that measures the percentage of agglomeration or breakdown of an asphalt-in-water emulsion upon addition of a predetermined amount of Portland cement), but also unexpectedly modified the base asphalt so that the emulsion residual asphalt had an appreciably higher softening point and more than 50% higher viscosity. It is entirely unexpected that the quebracho/surfactant emulsifier composition would produce a resulting residual asphalt layer that had a higher viscosity and had a 4° F. higher softening point. This is a premium product in that the higher viscosity and higher softening point temperature permit using the product in environments subject to higher pressure loads and temperatures without correspondingly higher deformation, such as road pavements and the like.

EXAMPLE 2

QSA Emulsifier Having pH <7(No Caustic)

A bituminous emulsion was prepared to show the use of the crude, spray-dried quebracho (Q) of this invention. The emulsifier was prepared by combining the dry, powdered crude spray-dried quebracho with a dry powdered surfactant, in this case Stepan $C_{14}$–$C_{16}$ alpha olefin sulfonate of Example 1, and adding the resulting powder combination to water to produce an emulsifier solution (QSA), but not adjusting the pH of the emulsifier with NaOH. The pH of the emulsifier solution was 5.3. The emulsifier solution and an asphalt with a penetration value of 60 were combined in a colloid mill to produce a bituminous emulsion. The resulting emulsion had the following composition:

TABLE IV

Example 2 Asphalt-In-Water Emulsion Composition

| COMPONENT | AMOUNT | % w/w |
|---|---|---|
| Asphalt | 13,841 gms | 61% |
| Quebracho (Crude, spray-dried) | 590 gms | 2.6% |
| Surfactant (Bio-Terge AS-90 Beads) | 91 gms | 0.4% |
| Water | 8,146 gms | 36% |

The resulting emulsion was tested according to ASTM D 244 and D 88 standards and was determined to be anionic and slow-setting with the properties as set forth in Table V:

TABLE V

Example 2 Low pH, Anionic QSA Emulsion Properties

| TEST | DATA |
|---|---|
| Residue | 61.0% |
| Sieve Residue | Nil |
| Cement Mixing | 1.6% |
| Charge | Negative |
| Viscosity, 77° F. | 43 sfs |

This test illustrates that this emulsifier mixture produces a stable anionic emulsion even when used at an acidic pH of 5.3. Even at a pH below 7, the emulsion is anionic, as noted by the charge. Note that caustic was not required.

EXAMPLE 3

RQSAC Emulsifier

An anionic bituminous emulsion was prepared to show the use of the refined (bisulfite-treated) quebracho (RQ) of this invention. The emulsifier was prepared by combining the dry, powdered refined quebracho (RQ) with a dry, powdered alpha olefin sulfonate (SA) to form a dry mixed powder (RQSA), and adding this powder mixture combination to water, mixing until dissolved, and adjusting the pH to 10 with NaOH beads (C) to form a pH-adjusted emulsifier solution QSAC. The emulsifier solution and an asphalt having a penetration value of 60 were combined in a colloid mill to produce a bituminous emulsion. The resulting emulsion had the following components:

TABLE VI

Example 3 Asphalt-In-Water Emulsion Composition

| COMPONENT | AMOUNT | % w/w |
|---|---|---|
| Asphalt | 13,841 gms | 61% |
| Refined quebracho (RQ) | 590 gms | 2.6% |
| Surfactant (SA) (Bio-Terge AS 90 Beads) | 91 gms | 0.4% |
| NAOH (C) | 83 gms | 0.3% |
| Water | 8,096 gms | 35.7% |

The resulting emulsion was tested according to ASTM D 244 and D 88 standards which showed it was anionic and slow-setting with the properties set forth in Table VII:

TABLE VII

Example 3 Anionic RQSAC Emulsion Properties

| TEST | DATA |
|---|---|
| Residue | 60.0% |
| Sieve Residue | Nil |
| Cement Mixing | 1.84% |
| Charge | Negative |
| Viscosity, 77° F. | 32 sfs |

This example illustrates that refined quebracho can be substituted for the crude spray-dried quebracho to produce an anionic, stable, slow setting asphalt-in-water emulsion.

EXAMPLE 4

RQSA Emulsifier Having pH <7(No Caustic)

A bituminous emulsion was prepared to show the use of the refined (bisulfite-treated) quebracho (RQ) of this invention. The emulsifier solution was prepared by combining the dry, powdered refined quebracho (RQ) with a dry, powdered alpha olefin sulfonate (SA) to form a dry mixed powder, and adding this powdered mixture combination (RQSA) to water, but not adjusting the pH with NaOH (C) to form a non-pH adjusted emulsifier solution (RQSA). The pH of the emulsifier was 4.5. The emulsifier solution and an asphalt having a penetration value of 75 were combined in a colloid mill to produce the bituminous emulsion. The resulting emulsion had the following composition:

TABLE VIII

Example 4 Asphalt-In-Water Emulsion Composition

| COMPONENT | AMOUNT | % w/w |
|---|---|---|
| Asphalt | 13,841 gms. | 61.3% |
| Surfactant (SA) (Bio-Terge AS-90) | 91 gms. | 0.4% |
| Refined quebracho (RQ) | 590 gms. | 2.6% |
| Water | 8,146 gms. | 35.7% |

The resulting emulsion was tested according to ASTM D 244 and D 88 standards and was determined to be anionic and slow setting with the properties set forth in Table IX:

TABLE IX

Example 4 Anionic RQSA Emulsion Properties

| TEST | DATA |
|---|---|
| Residue | 61.0% |
| Sieve Residue | Nil |
| Cement Mixing | 0.51% |
| Charge | Negative |
| Viscosity, 77° F. | 41 sfs |

The refined quebracho produced a stable, anionic, slow-setting emulsion at an acidic pH of 4.5. As in Example 2, no caustic was required to maintain a negative charge.

EXAMPLES 5(a–d)

Effect of Varying Q and SA on QSAC Asphalt-In-Water Emulsions

Asphaltic emulsions meeting ASTM D 244 standards for slow-setting emulsions were prepared by combining dry, powdered quebracho/surfactant mixtures (QSA) of varying compositions with water, pH-adjusting with caustic (C) to about pH 10 to form a pH-adjusted emulsifier solution (QSAC), and then combining the emulsifier solution with asphalt in a colloid mill to produce bituminous emulsions having preselected amounts of quebracho and surfactant in the composition.

The residual asphalt from these tests was separated by evaporation per ASTM D 244 and tested for viscosity and compared with the viscosity of the base asphalt. All of the formulas contained 61% by weight asphalt, 3.0% by weight of the combination of crude spray-dried quebracho and 90%-active alpha olefin sulfonate (AOS) surfactant, with the remainder being water and sufficient NaOH to adjust the pH of the emulsifier solution to 10 prior to addition to the asphalt in a colloid mill.

TABLE X

QSAC Asphalt-In-Water Emulsion Residual of Selected Q/SA Proportions
Emulsifier Solution = Q(3%) + SA

| EXAMPLE | % QUEBRACHO | % AOS * | % ASPHALT | VISCOSITY |
|---|---|---|---|---|
| 5a | Base asphalt | N/A | N/A | 1,249 poises |
| 5b | 2.5% | 0.5% | 61% | 1,704 poises |
| 5c | 2.6% | 0.4% | 61% | 1,964 poises |
| 5d | 2.8% | 0.2% | 61% | 2,023 poises |

* AOS = alpha olefin sulfonate, sodium salt

These examples show that the combination of the quebracho component of the emulsifier and the base asphalt produces a residual asphalt having the unexpected characteristic of a higher viscosity as compared to the base asphalt by itself. Further, and even more unexpected, by adjusting the amount of quebracho in the emulsifier composition, the viscosity of the resulting residual asphalt layer can be controlled. In all cases the asphalt-in-water emulsion was very fluid, easy to pour and spread in the conventional manner, e.g., by spray, broom or brush on a pavement surface.

EXAMPLE 6

Comparative Example: Adhesion of Filled QSAC vs Filled Vinsol ®

Two bituminous sealers were prepared. These sealers consisted of slow setting emulsions of this invention to which were added equal amounts of a mixture of conventional emulsion fillers of the type used to obtain resistance to wear, provide crack filling characteristics, etc. The sole difference between the two sealers was that one was prepared using an asphalt emulsion containing Vinsol ® NVX (a natural resin from Hercules) as an emulsifier and the other was prepared using an emulsifier composition of this invention of Example 5c, i.e. 2.6% crude spray-dried quebracho, 0.4% alpha olefin sulfonate surfactant (Stepan AS-90 Beads), and sufficient NaOH to obtain a pH of 10 prior to mixing in a colloid mill.

The sealers were deposited on ordinary roof shingles (tar paper coated with hard aggregates), to approximate the application of the sealers to a pavement surface. The shingles with the asphalt coatings were soaked in water for 48 hours followed by heating in an oven at 140° F. for a minimum of 12 hours and until dry to a constant weight, then frozen for 24 hours, reheated to 140° F., and finally cooled to room temperature. This cycle was repeated a second time. Visual inspection showed that the sealer made from Vinsol ® pulled away from the shingle and partly delaminated, whereas the sealer made with quebracho did not. The adhesion was clearly better with the quebracho-based emulsion product.

This example shows that the quebracho/olefin sulfonate emulsifier produces a stable filled bituminous sealer having superior adhesion to shingles having an aggregate surface, as an approximation of a pavement surface, as compared to the emulsion made with Vinsol ®. It also demonstrates the ability of the QSAC emulsion to accept filler loading without breaking.

EXAMPLE 7

Comparative Example: QSAC vs Vinsol ® Surface Torque Test

The two bituminous sealers prepared in Example 6 were subjected to a modified version of the International Slurry Surfacing Association (ISSA) test described in Technical Bulletin 39, the Cohesion Classification Test. This test measures the torque required to compress samples of the pavement sealers with a neoprene foot at measured time intervals after the sealer has been poured into a mold; the higher the torque value, the harder the sample. This test measures the relative time required for the samples to become hard enough to walk on.

TABLE XI

Curing Time - Surface Torque Test Results

| Time (min.) | Torque (Kg-mm) Quebracho Product | Torque (Kg-mm) Vinsol ® Product |
|---|---|---|
| 10 | 0 | 0 |
| 20 | 60 | 50 |
| 30 | 80 | 50 |
| 40 | 100 ----+ | 60 |
| 50 | 110     \| | 70 |
| 60 | 112     \|. | 72 |
| 70 | 112   +----> | 100 |
| : | : | : |
| : | : | : |
| 100 | 120 | 120 |

The quebracho/olefin sulfonate emulsifier of this invention produces an asphalt/water emulsion which dries significantly faster than an emulsion produced using Vinsol ®. Although the same ultimate surface torque hardness is reached, surprisingly the QSAC asphalt/water emulsion of this invention was hard enough to walk on in 40 minutes, whereas the Vinsol ® coating took nearly 30 minutes longer to achieve the same surface hardness. This reduction in time to utilize a newly coated surface is very significant and represents a clearly superior product in the trade.

EXAMPLE 8

Comparative Durability of QSAC vs Vinsol ® Emulsions

Pavement sealers made using Vinsol ® and quebracho/alpha olefin sulfonate, as described in Example 6, were subjected to the ISSA Wet Track Abrasion Test described in Technical Bulletin 100 to determine the relative resistance to wear of the two sealers. The measured loss in a defined time period for the Vinsol ® sealer was 22.95 grams/square foot vs. only 20.90 grams/square foot for the sealer of this invention made with quebracho. These results further demonstrate the adhesive strength imparted to an asphalt in water emulsion by the use of the quebracho/olefin sulfonate emulsifier as compared to the emulsion made using the Vinsol ® product. The superior resistance to abrasion and adhesion of the QSAC asphalt/water emulsion of this invention is significant since pavement sealers made from the emulsion of this invention will wear less thus requiring less frequent replacement. Further, improved adhesion and wear provides superior protection to the underlying pavement thus preventing the accelerated roadway wear caused by exposure of the pavement to water and ice.

EXAMPLE 9

Comparative Viscosity Example of QSAC vs Vinsol ® Emulsions

Two anionic bituminous QSAC emulsions of this invention were prepared as in Example 1 with one emulsion having a 61% w/w asphalt to 35.7% w/w water ratio and the other emulsion having a 58% w/w asphalt to 38.7% w/w water ratio. These QSAC stable anionic slow setting emulsions are compared with an emulsion made with Vinsol ® in Table XII:

TABLE XII

| QSAC vs Vinsol ® Emulsion Viscosity | | | |
|---|---|---|---|
| | EMULSIONS | | |
| COMPONENT | I | II | III |
| Asphalt | 61% | 61% | 58% |
| Vinsol ® NVX | 3% | — | — |
| Quebracho (Q) (crude, spray-dried) | — | 2.6% | 2.6% |
| Surfactant (SA) (Bio-Terge AS-90 Beads) | — | 0.4% | 0.4% |
| NAOH (C) | — | 0.3% | 0.3% |
| Water | 36% | 35.7% | 38.7% |
| Viscosity, 77° F. sfs | 34 sec. | 39 sec. | 31 sec. |

Comparison of Emulsion I (Vinsol ®) with Emulsion II (QSAC), both at 3%, shows that the use of the quebracho/olefin sulfonate emulsifier of this invention results in a more highly viscous emulsion (39 sec.) than that obtained using a Vinsol ® emulsifier (34 sec.). Comparing Emulsion I (Vinsol ®) with Emulsion III (QSAC), shows that the viscosity of the QSAC Emulsion II can be reduced to 31 seconds from 39 seconds simply by adding water (adding 2-3% more). This permits the use of less asphalt when using the QSAC emulsifier of this invention (58% Asphalt in Emulsion III) in order to achieve a similar final viscosity as a Vinsol ® emulsion (61% Asphalt in Emulsion I).

EXAMPLE 10

Wet QSAC Direct Emulsion Process

An asphalt emulsion was prepared by adding a solution of crude quebracho (Q) and NaOH (C) (see 33 in FIG. 1) directly into the asphalt (7 in FIG. 1) with the water being driven off by the high asphalt temperature. That asphalt was then mixed in a colloid mill with a water solution of surfactant (SA) (Bio-Terge AS-90) and NaOH to form a stable asphalt emulsion passing the ASTM standards for a slow setting emulsion.

In this example, the solution of crude spray-dried quebracho was prepared using 204.5 grams of quebracho mixed with 600 grams of water and 20 grams of NaOH to saponify. This mixture (33 in FIG. 1) was added directly to 4,795.8 grams of hot asphalt (7 in FIG. 1) with the water being driven off (36 in FIG. 1) to form a quebracho modified asphalt. A surfactant solution was then prepared using 31 grams of AOS surfactant (Bio-Terge AS-90 Beads), 25 grams of NaOH, and 2,805 grams of water. The surfactant solution was mixed with the quebracho modified asphalt in a colloid mill to form a stable, anionic, slow-setting emulsion. The resultant residual asphalt from this emulsion (as obtained by evaporation per ASTM D 244) was compared with the base asphalt as follows:

TABLE XIII

| Wet QSAC Emulsion Residual vs Base Asphalt | | |
|---|---|---|
| ASTM STANDARD TEST | Base Asphalt | Emulsion Residue |
| Penetration (77° F., dmm) | 100 | 90 |
| Viscosity (149° F., poise) | 830.3 | 950.3 |
| Ductility (77° F., cm) | 82 | 99 |
| Softening Point (°F.) | 102 | 107 |

This example demonstrates a method of adding quebracho directly to the asphalt rather than to the surfactant solution. Surprisingly, the emulsion residual asphalt exhibits increased ductility, increased viscosity, increased softening point, and decreased penetration (increased hardness) as compared to the base asphalt. This is significant as improvements in these attributes are desirable for improved pavement sealers, coatings, and the like.

EXAMPLE 11

Comparative Test of KAO Concentrations—Emulsion Not Producable

By way of a comparative test, three QSAC asphalt/water emulsifier solutions were prepared and then attempted to be combined with heated asphalt in a colloid mill to try to form an anionic emulsion at the reduced surfactant and tannic acid concentration as suggested by the Kao Japanese patent reference. The first emulsifier solution contained 0.3% w/w sodium oleate surfactant and 0.3% w/w quebracho, similar to the surfactant/tannic acid compound concentrations used in the examples of the KAO reference. The second emulsifier solution contained 0.6% w/w sodium oleate surfactant and 0.6% w/w quebracho, twice the concentrations of surfactant and tannic acid compound taught in the examples of the KAO reference. The third emulsifier solution contained 5% w/w sodium oleate surfactant and no quebracho. As taught in the Kao Japanese reference, no pH adjustment was made.

Attempts to form an asphalt water emulsion with the three emulsifier solutions were unsuccessful. In all three cases, an emulsion could not be formed. Chunks of unemulsified asphalt and the water solution were ejected from the colloid mill indicating that the emulsification process was not occurring at these relatively low levels of surfactant and quebracho. Consequently, applying the teachings of the KAO reference to Quebracho does not produce a stable anionic slow setting asphalt-in-water emulsion of this invention.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. An oil-in-water anionic bituminous emulsion comprising:
   a) from about 60% to about 20% by weight of a quebracho-containing emulsifying composition comprising 2.0% to 10.0% by dry weight of quebracho; 0.4% to 3.0% by active weight of a surfactant; said quebracho and surfactant components being dissolved in water as a continuous phase, said water present in an amount to make up 100% by weight; and an alkali sufficient to adjust the pH of the emulsifying solution to a value in the range of 4.5 to 11.5; as the aqueous dispersion phase; and
   b) from about 40% to about 80% by weight bitumen present in finely dispersed particles as the dispersed phase of said emulsion;
   c) said emulsion has properties of negative charge, high stability, slow-setting, high residue viscosity and high ionic headroom permitting loading with fillers without premature breaking.

2. An anionic bituminous emulsion as in claim 1 wherein said bitumen is asphalt.

3. An anionic bituminous emulsion as in claim 1 which includes filler material added in a quantity sufficient for application as a pavement sealer.

4. An oil-in-water anionic bituminous emulsion comprising:
   a) from about 60% to about 20% by weight of a quebracho-containing emulsifying composition comprising 2.0% to 10.0% by dry weight of quebracho; 0.4% to 3.0% by active weight of a surfactant; said quebracho and surfactant components being dissolved in water as a continuous phase, said water present in an amount to make up 100% by weight; and an alkali sufficient to adjust the pH of the emulsifying solution to a value in the range of 4.5 to 11.5; as the aqueous dispersion phase; wherein said quebracho is selected form the group consisting essentially of crude lump quebracho, crude spray-dried quebracho, sodium bisulfite-treated spray-dried quebracho, bleached spray-dried quebracho and mixtures thereof; wherein said surfactant is selected from the group consisting essentially of the salts of alpha olefin sulfonates, alkyl aryl sulfonates and mixtures thereof; and
   b) from about 40% to about 80% by weight bitumen present in finely dispersed particles as the dispersed phase of said emulsion;
   c) said emulsion has properties of negative charge, high stability, slow-setting, high residue viscosity and high ionic headroom permitting loading with fillers without premature breaking.

5. A method of making a highly stable oil-in-water anionic bituminous emulsion comprising in any operative order the steps of:
   a) dissolving a quantity of quebracho in a quantity of bitumen to produce a modified bitumen;
   b) combining said modified bitumen with a quantity of aqueous anionic surfactant; and
   c) milling said surfactant with said modified bitumen to produce a bitumen-in-water emulsion.

6. A method of making a highly stable oil-in-water anionic bituminous emulsion as recited in claim 5 wherein said bitumen is asphalt.

7. A method of making a highly stable oil-in-water anionic bituminous emulsion comprising in any operative order the steps of:
   a) providing a dry, powdered, pre-mixed anionic emulsifying composition, comprising: 83.3% to 77.0% by dry weight of dry, powdered quebracho; and 16.7% to 23.0% by active weight of a dry surfactant;
   b) dissolving said pre-mixed anionic emulsion composition in a quantity of water to form a surfactant solution;
   c) adjusting the pH of said surfactant solution with an alkali to form a pH-adjusted surfactant solution;
   d) combining said pH-adjusted surfactant solution with a quantity of heated bitumen; and
   e) milling said pH-adjusted surfactant solution with said bitumen to produce a bitumen-in-water emulsion.

8. A method of making a highly stable oil-in-water anionic bituminous emulsion as recited in claim 7 wherein said bitumen is asphalt.

9. A method of making a highly stable oil-in-water anionic bituminous emulsion comprising in any operative order the steps of:
   a) providing a dry, powdered, pre-mixed anionic emulsifying composition, comprising: 83.3% to 77.0% by dry weight of dry, powdered quebracho; 16.7% to 23.0% by active weight of a dry surfactant; and a dry alkali in an amount sufficient to adjust the pH of an aqueous emulsifying solution of said composition to a value in the range of about 4.5 to 11.5, upon addition of water to said dry, powdered, pre-mixed anionic emulsifying composition;
   b) dissolving said pre-mixed anionic emulsion composition in a quantity of water to form a pH-adjusted surfactant solution;
   c) combining said pH-adjusted surfactant solution with a quantity of heated bitumen; and
   d) milling said pH-adjusted surfactant solution with said bitumen to produce a bitumen-in-water emulsion.

10. A method of making a highly stable oil-in-water anionic bituminous emulsion as recited in claim 9 wherein said bitumen is asphalt.

* * * * *